United States Patent Office 3,558,475
Patented Jan. 26, 1971

3,558,475
HYDROTREATING CATALYST AND PROCESS
Joseph Jaffe, Berkeley, Calif., assignor to Chevron Research Company, San Francisco, Calif., a corporation of Delaware
Continuation-in-part of application Ser. No. 757,430, Sept. 4, 1968, which is a continuation-in-part of application Ser. No. 749,836, Aug. 2, 1968. This application Dec. 8, 1969, Ser. No. 883,184
Int. Cl. C10g 13/02
U.S. Cl. 208—111
13 Claims

ABSTRACT OF THE DISCLOSURE

A catalyst comprising a crystalline zeolitic molecular sieve component substantially free of any catalytic metal or metals, a silica-containing gel component, a Group VI hydrogenating component and a Group VIII hydrogenating component, and processes using said catalyst.

RELATED APPLICATIONS

This application is a continuation-in-part of Joseph Jaffe application Ser. No. 757,430, filed Sept. 4, 1968, now abandoned for "Hydrotreating Catalyst and Process," which in turn is a continuation-in-part of Joseph Jaffe application Ser. No. 749,836, filed Aug. 2, 1968, now abandoned, for "Hydrotreating Catalyst and Process."

INTRODUCTION

This application relates to catalytic hydrocracking of petroleum distillates and solvent-deasphalted residua to produce high-value fuel products, including jet fuels and gasoline.

PRIOR ART

It is known that a catalyst may comprise a crystalline zeolitic molecular sieve component associated with other catalyst components. It is also known that at least some of said other catalyst components may be in the form of a matrix in which the molecular sieve component is dispersed. It is also known that such catalysts may be used for such reactions as catalytic cracking, hydrocracking, and hydrodesulfurization. Representative prior art patents disclosing one or more of the foregoing matters include: U.S. Pats. 3,140,251 and 3,140,253; British Pat. 1,056,301; and French Pats. 1,503,063 and 1,506,793.

There has been a continuing search for further improvements in such catalysts, particularly for hydrocracking and hydrofining uses. It is known that the results of such catalyst modifications often are largely unpredictable, and the increased number of possible modifications in catalysts containing an additional molecular sieve component does not diminish the unpredictability. A significantly improved result in a test with a modified catalyst containing a molecular sieve component and other catalyst components seldom would have been predictable before the test, particularly in hydrocracking and hydrofining applications of such catalysts, and is a much-desired goal.

OBJECTS

In view of the foregoing, objects of the present invention include providing an improved catalyst comprising a crystalline zeolitic molecular sieve component associated with other catalyst components that has, compared with similar prior art catalysts:

(1) improved hydrocracking activity,
(2) improved hydrodenitrification activity, and particularly in certain of its embodiments,
(3) improved hydrocracking stability, and
(4) improved hydrodenitrification stability.

Further objects of the present invention include provisions of hydrocracking and hydrofining processes, and combinations thereof, using said improved catalyst, that are capable of producing high yields of excellent-quality jet fuel and other valuable fuel products.

The present invention will best be understood, and further objects and advantages thereof will be apparent, from the following description when read in connection with the accompanying drawing.

DRAWING

Figure 1:
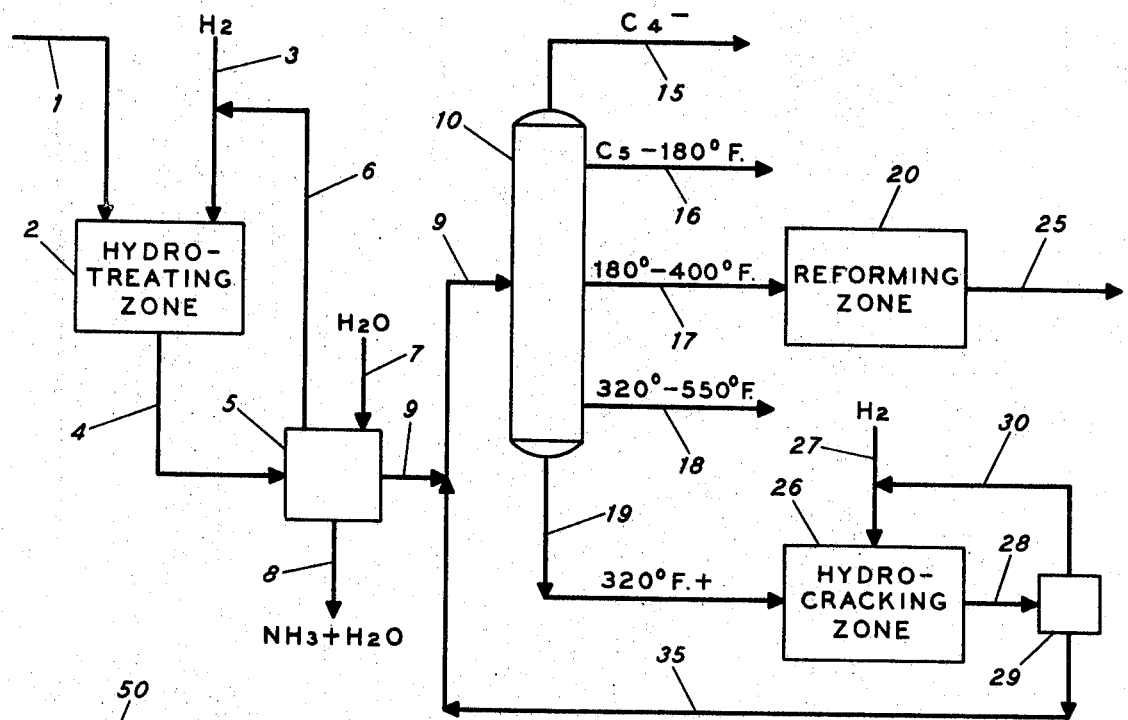

In the drawing, FIG. 1 is a diagrammatic illustration of apparatus and flow paths suitable for carrying out the process of several of the embodiments of the present invention, wherein the catalyst of the present invention is usd on a one-through basis to concurrently hydrocrack and hydrodenitrify a hydrocarbon feedstock to produce more valuable products, some of which may be further upgraded by catalytic reforming or catalytic hydrocracking, if desired.

Figure 2:
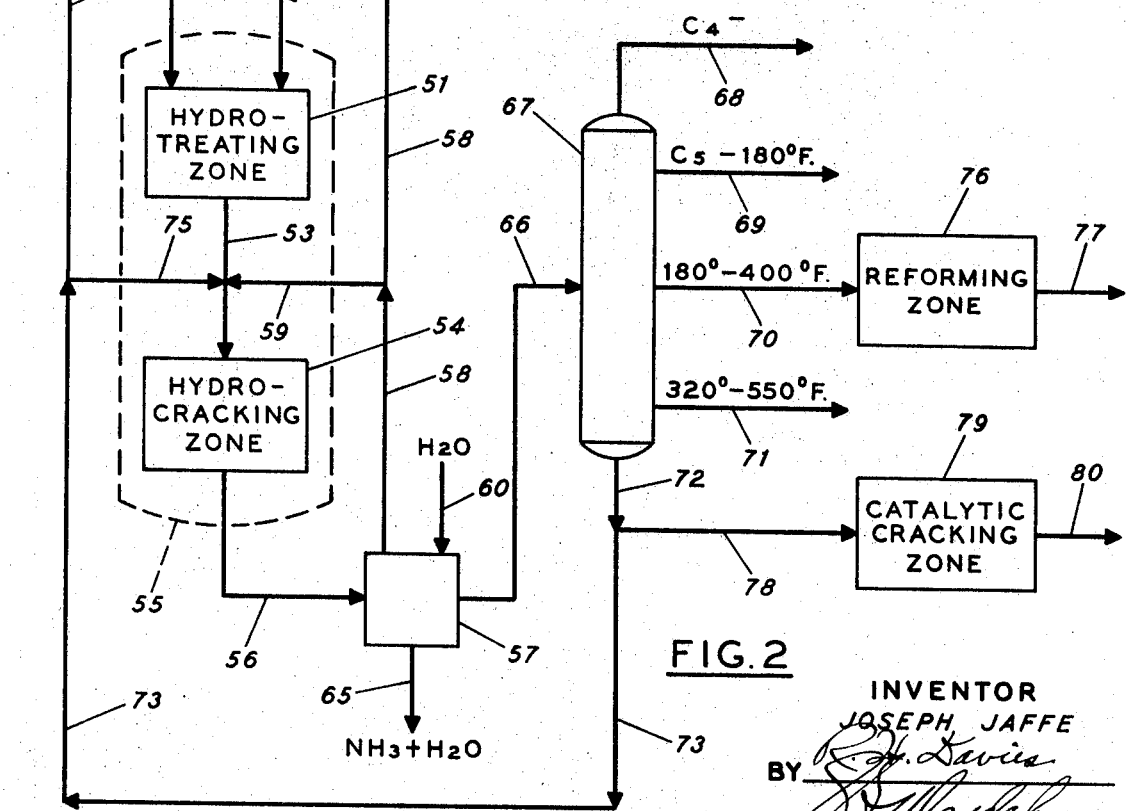

FIG. 2 is a diagrammatic illustration of apparatus and flow paths suitable for carrying out the process of additional embodiments of the present invention, wherein the catalyst of the present invention is used to concurrently hydrofine and hydrocrack a hydrocarbon feedstock, wherein the hydrofining-hydrocracking zone may be operated on a recycle basis, and wherein certain portions of the effluent from the hydrofining-hydrocracking zone may be catalytically reformed or catalytically cracked, as desired.

STATEMENT OF INVENTION

In accordance with the present invention, it has been found that the foregoing objects are achieved by a catalyst containing a unique combination of catalytic components in particular amounts, including silica, alumina, a Group VI component, a Group VIII component, and a crystalline zeolitic molecular sieve component that is substantially in the ammonium or hydrogen form and that is substantially free of any catalytic loading metal or metals. Said catalyst also may contain a Group IV component to advantage.

More particularly, in accordance with the present invention there is provided a catalyst composite comprising:

(A) A gel matrix comprising:
(a) at least 15 weight percent silica,
(b) alumina, in an amount providing an alumina-to-silica weight ratio of 15/85 to 80/20,
(c) nickel or cobalt, or the combination thereof, in the form of metal, oxide, sulfide or any combination thereof, in an amount of 1 to 10 weight percent, preferably 5 to 9 weight percent, of said matrix, calculated as metal,
(d) molybdenum or tungsten, or the combination thereof, in the form of metal, oxide, sulfide or any combination thereof, in an amount of 5 to 25 weight percent, preferably 10 to 20 weight percent, of said matrix, calculated as metal;

(B) A crystalline zeolitic molecular sieve substantially in the ammonium or hydrogen form, substantially free of any catalytic loading metal or metals, said sieve further being in particulate form and being dispersed through said matrix; said catalyst composite being further characterized by an average pore diameter below 100 angstroms and a surface area above 200 square meters per gram.

Said gel matrix further may comprise titanium, zirconium, thorium or hafnium or any combination thereof, in the form of metal, oxide, sulfide or any combination thereof, in an amount of 1 to 10 weight percent, preferably 5 to 9 weight percent, of said matrix, calculated as metal. Such additional Group IV component or components will impart improved characteristics, notably stability to the catalyst.

Preferably, said gel matrix comprises nickel and tungsten, in the form of the metals, oxides, sulfides, or any combination thereof. When a Group IV component is present, preferably it is titanium, in the metal, oxide or sulfide form, with titania being especially preferred. Said molecular sieve may be present in an amount of 1 to 70 weight percent of said composite.

Still further in accordance with the present invention, there is provided a catalyst comprising:

(A) A porous xerogel comprising:

(a) at least 15 weight percent silica,
(b) alumina, in an amount providing an alumina-to-silica weight ratio of 15/85 to 80/20,
(c) nickel, in the form of metal, oxide, sulfide or any combination thereof, in an amount of 1 to 10 weight percent, preferably 5 to 9 weight percent, of said xerogel, calculated as metal,
(d) tungsten, in the form of metal, oxide, sulfide or any combination thereof, in an amount of 5 to 25 weight percent, perferably 10 to 20 weight percent, of said xerogel, calculated as metal, (B) A crystalline zeolitic molecular sieve, in an amount of 1 to 70 weight percent of said catalyst, said sieve being substantially in the ammonium or hydrogen form, and being substantially free of any catalytic loading metal or metals, said sieve further being in the form of particles, said particles being dispersed through said xerogel;

said catalyst having an average pore diameter below 100 angstroms and a surface area above 200 square meters per gram.

Said porous xerogel further may comprise titanium, zirconium, thorium or hafnium or any combination thereof, in the forms and amounts prevously discussed.

Still further in accordance with the present invention, there is provided a catalyst comprising a silica-alumina matrix having dispersed in it particles of a low-sodium molecular sieve zeolite, the silica-alumina matrix having dispersed in it a Group VI metal or metal compound and a Group VIII metal or metal compound and the zeolite being substantially free of chemically or physically bonded metals or metal compounds having appreciable catalytic activity for hydrogenation.

Still further in accordance with the present invention, there is provided a catalyst comprising a crystalline zeolitic molecular sieve in the ammonium or hydrogen form and substantially free of metals or metal compounds having catalytic activity for hydrogenation dispersed in a hydrocracking catalyst matrix comprised of silica-alumina having dispersed in it 1 to 10 percent by weight of nickel in the form of metal, metal oxide or metal sulfide and 5 to 25 percent by weight of molybdenum or tungsten in the form of metal, metal oxide or metal sulfide.

Still further in accordance with the present invention, there is provided a hydrotreating process which comprises contacting a hydrocarbon feed containing substantial amounts of materials boiling above 200° F. and selected from the group consisting of petroleum distillates, solvent-deasphalted petroleum residua, shale oils and coal tar distillates, in a reaction zone with hydrogen and any of the embodiments described above of the catalyst of the present invention, at hydrotreating conditions including a temperature in the range 400° to 950° F., a pressure in the range 800 to 3500 p.s.i.g., a liquid hourly space velocity in the range 0.1 to 5.0 and a total hydrogen supply rate of 200 to 20,000 s.c.f. of hydrogen per barrel of feedstock, and recovering hydrotreated products from said reaction zone. The hydrocarbon feed may contain a substantial amount of organic nitrogen, because the catalyst of the present invention is extremely tolerant of organic nitrogen as well as ammonia, and because the catalyst is an efficient hydrodenitrification catalyst. The catalyst will accomplish hydrodenitrification and hydrocracking concurrently and efficiently. The catalyst may be used as a hydrodenitrification catalyst in a zone preceding a hydrocracking zone containing a similar or different hydrocracking catalyst. A superior jet fuel product may be produced when the catalyst is used for hydrocracking a suitable feedstock. A superior feedstock for a catalytic reformer also may be produced when the catalyst is used for hydrocracking. The hydrocracking zone effluent boiling above the gasoline boiling range, or boiling above the jet fuel boiling range when a jet fuel product is being recovered, may be catalytically cracked to produce additional valuable products.

The reference to a crystalline zeolitic molecular sieve "substantially free of any catalytic loading metal or metals" means that the molecular sieve contains no more than 0.5 total weight percent of catalytic metal or metals, calculated as metal and based on the sieve, of which no more than 0.1 weight percent may be a noble metal or metals. The catalytic metal or metals include the Group VI and VIII metals.

It will be noted that the weight ratio of catalytic metal in the non-molecular sieve portion of the catalyst to catalytic metal in the molecular sieve portion of the catalyst is high. Certain prior art catalysts achieve a low catalytic metal loading of the molecular sieve component only with a concurrent very low metal content of the nonmolecular sieve portion of the catalyst, and it has been found that such catalysts are inferior to the catalyst of the present invention.

HYDROCARBON FEEDSTOCKS

The feedstocks supplied to the hydrofining-hydrocracking zone in the process of the present invention are selected from the group consisting of petroleum distillates, solvent-deasphalted petroleum residua, shale oils and coal tar distillates. The feedstocks contain substantial amounts of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. Because of the superior hydrofining activity and stability of the catalyst of the present invention, the feedstocks need not be subjected to a prior hydrofining treatment before being used in the hydrofining-hydrocracking process of the present invention. Feedstocks may contain as high as several thousand parts per million organic nitrogen, although preferably the organic nitrogen content will be less than 1000 parts per million organic nitrogen. Feedstocks also may contain several weight percent organic sulfur.

CATALYST COMPRISING A CRYSTALLINE ZEOLITIC MOLECULAR SIEVE COMPONENT AND PREPARATION THEREOF

(A) General

The crystalline zeolitic molecular sieve component of the hydrofining-hydrocracking catalyst may be of any type that is known in the art as a useful component of a conventional hydrocracking catalyst containing a crystalline zeolitic molecular sieve component. A decationized molecular sieve cracking component is preferred. Especially suitable are faujasite, particularly "Y" type and "X" type faujasite, and mordenite, in the ammonium or hydrogen form.

(B) Method of preparation

The molecular sieve component of the catalyst may be prepared by any conventional method known in the art.

The molecular sieve components may be dispersed in a matrix of the other catalyst components by cogelation of said other components around said molecular sieve components in a conventional manner.

The molecular sieve component, substantially in the ammonium or hydrogen form, may be maintained substantially free of any catalytic loading metal or metals, as required by the present invention, by dispersing the molecular sieve component in a slurry of the precursors of the other catalyst components at a pH of 5 or above. When a sodium form of molecular sieve component is one of the starting materials, it may be converted to the ammonium or hydrogen form by ion exchange prior to being combined with the other catalyst components. Alternatively, it may be combined with the other catalyst components and then converted to the ammonium or hydrogen form by ion exchange. In either case, the molecular sieve component should not be combined with the precursors of the other catalyst components at a pH below 5.

The finished catalyst may be sulfided in a conventional manner prior to use, if desired, If not presulfided, the catalyst will tend to become sulfided during process operation from any sulfur content that may be present in the hydrocarbon feed.

OPERATING CONDITIONS

The hydrofining-hydrocracking zone containing the catalyst of the present invention is operated at a temperaure in the range 400° to 950° F., preferably 500° to 850° F., a pressure in the range 800 to 3500 p.s.i.g., preferably 1000 to 3000 p.s.i.g., a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 s.c.f., preferably 2000 to 20,000 s.c.f. of hydrogen per barrel of hydrocarbon feedstock.

The operating conditions in the reforming zone and catalytic cracking zone employed in various embodiments of the present invention are conventional conditions known in the art.

PROCESS OPERATION WITH REFERENCE TO DRAWINGS

Referring now to FIG. 1 of the drawing, in accordance with one embodiment of the present invention, a hydrocarbon feedstock as previously described, which in this case may boil above 400° F. and which may contain a substantial amount of organic nitrogen compounds, is passed through line 1 into hydrofining-hydrocracking zone 2, which contains the catalyst of the present invention. The feedstock is hydrocracked in hydrocracking zone 2 at conditions previously described, in the presence of hydrogen supplied through line 3. Under these conditions, concurrent hydrodenitrification takes place to the extent that the feedstock is substantially denitrified. The effluent from zone 2 is passed through line 4 to separation zone 5, from which hydrogen separated from the treated feedstock is recycled through line 6 to zone 2. In zone 5, water entering through line 7 is used to scrub ammonia and other contaminants from the incoming hydrocarbon stream, and the ammonia, water and other contaminants are withdrawn from zone 5 through line 8. From zone 5, the scrubbed, hydrocracked materials are passed through line 9 to distillation column 10, where they are separated into fractions, including a $C_4$-fraction which is withdrawn through line 15, a $C_5$–180° F. fraction which is withdrawn through line 16, a 180°–400° F. fraction which is withdrawn through line 17, a 320°–550° F. fraction which is withdrawn through line 18, and a 320° F.+ fraction which is withdrawn through line 19. The $C_5$–180° F fraction withdrawn through line 16 is a superior-quality light gasoline. The 180°–400° F. fraction withdrawn through line 17 is a superior catalytic reforming feedstock, which may be catalytically reformed in reforming zone 20, from which a superior catalytic reformate may be withdrawn through line 25. The 320°–550° F. fraction withdrawn through line 18 is a superior-quality jet fuel. The 320° F.+ fraction withdrawn through line 19 is a superior hydrocracking feedstock, which may be catalytically hydrocracked in hydrocracking zone 26 in the presence of a conventional hydrocracking catalyst and in the presence of hydrogen supplied to zone 26 through line 27. From hydrocracking zone 26, an effluent may be withdrawn through line 28, hydrogen may be separated therefrom in separator 29, and hydrogen may be recycled to hydrocracking zone 26 through line 30. Alternatively, said 320° F.+ fraction may be catalytically cracked in a catalytic cracking zone under conventional catalytic cracking conditions. From separator 29, hydrocracked materials may be passed through lines 35 and 9 to distillation column 10, where they may be separated into fractions, as previously described.

Referring now to FIG. 2, a hydrocarbon feedstock as previously described, which in this case may boil above 400° F. and which may contain substantial amounts of organic nitrogen compounds, is passed through line 50 to hydrofining-hydrocracking zone 51, containing the catalyst of the present invention. The feedstock is concurrently hydrofined and hydrocracked in zone 51 at conditions previously described in the presence of hydrogen supplied through line 52. The effluent from zone 51 may be passed through line 53 into hydrocracking zone 54, where it may be hydrocracked under the same conditions as used in zone 51, in the presence of a hydrocracking catalyst. The hydrocracking catalyst in zone 54 may be the same catalyst as used in zone 51, or may be a conventional hydrocracking catalyst comprising a crystalline zeolitic molecular sieve cracking component, in either of which cases the effluent from zone 51 may be passed through line 53 into zone 54 without intervening impurity removal. If the hydrocracking catalyst in zone 54 does not contain a crystalline zeolitic molecular sieve component, it is preferred that interstage removal of ammonia and other impurities be accomplished between zones 51 and 54. Zones 51 and 54 may be located in separate reactor shells, which may be operated at different pressures. Alternatively, zones 51 and 54 may be separate catalyst beds located in a single pressure shell 55, and the effluent from zone 51 may be passed to zone 54 without intervening pressure letdown, condensation or impurity removal, particularly in the case where zone 54 contains the catalyst of the present invention or a conventional catalyst comprising a crystalline zeolitic molecular sieve component. The effluent from zone 54 is passed through line 56 to separation zone 57, from which hydrogen is recycled through line 58 to hydrofining-hydrocracking zone 51. All or a portion of the recycled hydrogen may be passed through line 59 to hydrocracking zone 54, if desired. In separation zone 57, water entering through line 60 is used to scrub ammonia and other contaminants from the incoming hydrocarbon stream, if these contaminants previously have not been removed between zones 51 and 54, and the ammonia, water and other contaminants are withdrawn from zone 57 through line 65. The effluent from zone 57 is passed through line 66 to distillation column 67, where it is separated into fractions, including a $C_4$-fraction which is withdrawn through line 68, a $C_5$–180° F. fraction which is withdrawn through line 69, a 180°–400° F. fraction which is withdrawn through line 70, a 320°–550° F. fraction which is withdrawn through line 71, and a 320° F.+ fraction which is withdrawn through line 72. The fraction withdrawn through line 72 may be recycled through lines 73 and 74 to hydrofining-hydrocracking zone 51, and this a preferred manner of operation. All or a portion of the fraction in line 73 may be recycled to hydrocracking zone 54 through line 75, if desired. The C$_5$–180° F. fraction withdrawn through line 69 is a superior-quality light gasoline. The 180°–400° F. fraction withdrawn through line 70 is a superior catalytic reforming feedstock, which may be catalytically reformed in reforming zone 76, from which a superior catalytic reformate may be withdrawn through line 77. The 320°–550° F. fraction withdrawn through line 71 is a superior-quality jet fuel. All or a portion of the 320° F.+ fraction withdrawn through line 72 may be passed through line 78 to catalytic cracking zone 79, where it may be catalytically cracked under conventional catalytic cracking conditions in the presence of a conventional catalytic cracking catalyst to produce valuable fuel products, which may be withdrawn from zone 79 through line 80.

EXAMPLES

The following examples are given for the purpose of further illustrating the catalyst of the present invention, the preparation thereof, and the use thereof in the process of the present invention. The examples are not intended to limit the scope of the present invention.

Example 1

A cogelled catalyst (Catalyst A) of the following composition was prepared:

| Component: | Wt. percent of total catalyst |
|---|---|
| NiO | 10.0 |
| WO$_3$ | 24.5 |
| Al$_2$O$_3$ | 29.0 |
| SiO$_2$ | 25.5 |
| Crystalline zeolitic molecular sieve, "Y" form | 11.0 |
| Total | 100.0 |

The catalyst was prepared by the following steps, using sufficient quantities of the various starting materials to produce the above-indicated weight percentages of the components of the final catalyst:

(1) An aqueous acidic solution was prepared, containing AlCl$_3$, NiCl$_2$ and acetic acid.

(2) Three alkaline solutions were prepared: (1) a sodium silicate solution; (2) a sodium tungstate solution; and (3) an aqueous ammonia solution containing sufficient ammonia so that upon combining the alkaline solutions with the acidic solution coprecipitation of all of the metal-containing components of the solutions would occur at a neutral pH of about 7.

(3) The acidic and alkaline solutions were combined, and coprecipitation of all of the-metal-containing components of the solutions occurred at a pH of about 7, resulting in a slurry.

(4) Linde ammonium "Y" crystalline zeolitic molecular sieve in finely divided form was added to the slurry.

(5) The molecular sieve-containing slurry was filtered to produce a molecular sieve-containing hydrogel filter cake, which was washed repeatedly with dilute ammonium acetate solution, to remove sodium and chloride ionic impurities from both the hydrogel and the molecular sieve contained therein.

(6) The molecular sieve-containing hydrogel was dried in an air-circulating oven and then was activated in flowing air for 5 hours at 950° F.

The finished catalyst was characterized by a surface area of 417 M.$^2$/g., a pore volume of 0.4 cc./g., and an average pore diameter of 38 angstroms, and a molecular sieve component substantially free of catalytic metals; that is, substantially all of the nickel and tungsten contained in the catalyst was located in the gel portion of the catalyst rather than in the molecular sieve component thereof.

Example 2

A cogelled catalyst (Catalyst B) is prepared exactly as in Example 1, except that no molecular sieve component is incorporated therein. The amounts of starting materials are selected to provide a final catalyst with the same proportions of nonmolecular sieve components as the catalyst of Example 1. The composition of the final catalyst is:

| Component: | Wt. percent of total catalyst |
|---|---|
| NiO | 11.2 |
| WO$_3$ | 27.5 |
| Al$_2$O$_3$ | 32.6 |
| SiO$_2$ | 28.7 |
| Total | 100.0 |

It will be noted that the weight percentage of each nonmolecular sieve component of Catalyst A is 89% of the weight percentage of the same component of Catalyst B, the additional 11 weight percent of Catalyst A being contributed by the molecular sieve component.

Example 3

Portions of Catalysts A and B of Examples 1 and 2 are separately used to hydrocrack separate portions of a California gas oil feedstock, on a once-through basis.

The gas oil feedstock has the following characteristics:

| | |
|---|---|
| Boiling range, ° F | 500–900 |
| Gravity, ° API | 19 |
| Organic nitrogen content, p.p.m. | 3000 |

The hydrocracking conditions are:

| | |
|---|---|
| Total pressure, p.s.i.g | 2500 |
| Total hydrogen rate, s.c.f./bbl. | 10,000 |
| Liquid hourly space velocity, v./v./hr. | 0.8 |
| Per-pass conversion to products boiling below 550° F., vol. percent | 60 |
| Starting temperature, °F.—As indicated below. | |

The hydrocracking activities of the two catalysts, as measured by the starting temperatures necessary to achieve the indicated per-pass conversion, are:

| Catalyst: | Starting T, ° F. |
|---|---|
| A | 725 |
| B | 775 |

The 300°–500° F. jet fuel boiling range product in each case is of the same adequate quality, in that in each case the smoke point is 21 mm. and the freeze point is below —94° F.

The hydrocracked liquid product in each case is essentially free of organic nitrogen compounds, indicating that essentially complete hydrodenitrification accompanies the hydrocracking in each case.

From this example, it appears that: (1) the non-metal-loaded molecular sieve-containing gel catalyst (Catalyst A) has hydrocracking activity superior to that of a catalyst (Catalyst B) that does not contain a molecular sieve component but that is otherwise identical; and (2) the gel catalyst containing a non-metal-loaded molecular sieve component accomplishes essentially complete hydrodenitrification at a substantially lower temperature than Catalyst B.

Example 4

Another portion of Catalyst A of Example 1 is used to hydrocrack a solvent-deasphalted hydrocarbon oil boiling above 550° F. and containing 5500 p.p.m. organic nitrogen, on a once-through basis. Thereupon, said portion of Catalyst A is used to hydrocrack another portion of the same solvent-deasphalted oil, with extinction recycle of products boiling above 550° F.

The hydrocracking conditions, after operating equilibrium is reached, are:

| | Catalyst A once-through | Catalyst A recycle |
|---|---|---|
| Temperature, °F | 800 | 800 |
| Total pressure, p.s.i.g. | 2,500 | 2,500 |
| Total exit gas rate | 10,000 | 10,000 |
| Liquid hourly space velocity, v./v./hr | 0.8 | 0.8 |
| Conversion to 550° F.−, vol. percent | 40 | 75 |
| 300°–550° F. jet fuel product fraction: | | |
| Yield, vol. percent | 30.0 | 50.0 |
| Smoke point, mm | 20 | 30.0 |
| Freeze point, °F | −65 | −70 |
| Paraffins, vol. percent | 17.0 | 37.0 |
| Naphthenes, vol. percent | 68.0 | 54.0 |
| Aromatics, vol. percent | 15.0 | 9.0 |

From this example, it appears that a high yield of excellent-quality jet fuel is obtained from the solvent-deasphalted hydrocarbon oil feed, in both once-through and recycle operation. It also appears that the recycle operation results in superior hydrocracking activity, jet fuel yield and jet fuel quality, attributable to cracking into extinction into the jet fuel range of the normal paraffins concentrated in the high-boiling portion of the SDA oil.

EXAMPLE 5

The 550° F.+ product from the once-through operation in Example 4 is further processed in a subsequent hydrocracking or catalytic cracking stage. This product is a superior, upgraded feedstock for such subsequent processing.

Example 6

A cogelled catalyst (Catalyst C) of the following composition was prepared:

| Component: | Wt. percent of total catalyst |
|---|---|
| NiO | 9.2 |
| $WO_3$ | 22.7 |
| $TiO_2$ | 7.2 |
| $Al_2O_3$ | 27.0 |
| $SiO_2$ | 23.9 |
| Crystalline zeolitic molecular sieve, "Y" form | 10.0 |
| Total | 100.0 |

The catalyst was prepared by the following steps, using sufficient quantities of the various starting materials to produce the above-indicated weight percentages of the components of the final catalyst:

(1) An aqueous acidic solution was prepared, containing $AlCl_3$, $TiCl_4$, $NiCl_2$ and acetic acid;

(2) Three alkaline solutions were prepared: (1) a sodium silicate solution; (2) a sodium tungstate solution; and (3) an aqueous ammonia solution containing sufficient ammonia so that upon combining the alkaline solutions with the acidic solution coprecipitation of all of the metal-containing components of the solutions would occur at a neutral pH of about 7.

(3) The acidic and alkaline solutions were combined, and coprecipitation of all of the metal-containing components of the solutions occurred at a pH of about 7, resulting in a slurry.

(4) Linde sodium "Y" crystalline zeolitic molecular sieve in finely divided form was added to the slurry.

(5) The molecular sieve-containing slurry was filtered to produce a molecular sieve-containing hydrogel filter cake, which was washed repeatedly with dilute ammonium acetate solution, to remove sodium and chloride ionic impurities from both the hydrogel and the molecular sieve contained therein.

(6) The molecular sieve-containing hydrogel was dried in an air-circulating oven and then was activated in flowing air for 5 hours at 950° F.

The finished catalyst was characterized by a surface area of 384 $M.^2/g.$, a pore volume of 0.4 cc./g., and an average pore diameter of 42 angstroms, and a molecular sieve component substantially free of catalytic metals; that is, substantially all of the nickel, tungsten and titanium contained in the catalyst was located in the gel portion of the catalyst rather than in the molecular sieve component thereof.

Example 7

A cogelled catalyst (Catalyst D) was prepared exactly as in Example 6, except that no molecular sieve component was incorporated therein. The amounts of starting materials were selected to provide a final catalyst with the same proportions of nonmolecular sieve components as the catalyst of Example 6. The composition of the final catalyst was:

| Component: | Wt. percent of total catalyst |
|---|---|
| NiO | 10.2 |
| $WO_3$ | 25.0 |
| $TiO_2$ | 8.0 |
| $Al_2O_3$ | 30.0 |
| $SiO_2$ | 26.6 |
| Total | 100.0 |

It will be noted that the average weight percentage of each nonmolecular sieve component of Catalyst C is 90% of the weight percentage of the same component of Catalyst D, the additional 10 weight percent of Catalyst C being contributed by the molecular sieve component.

Example 8

Portions of Catalysts C and D of Examples 6 and 7 were separately used to hydrocrack separate portions of a California gas oil feedstock, on a once-through basis.

The gas oil feedstock had the following characteristics:

| | |
|---|---|
| Boiling range, °F | 500–900 |
| Gravity, °API | 19 |
| Organic nitrogen content, p.p.m. | 3000 |

The hydrocracking conditions were:

| | |
|---|---|
| Total pressure, p.s.i.g. | 2500 |
| Total hydrogen rate, s.c.f./bbl. | 10,000 |
| Liquid hourly space velocity, v./v./hr. | 0.8 |
| Per-pass conversion to products boiling below 550° F., vol. percent | 60 |
| Starting temperature, °F—As indicated below. | |

The hydrocracking activities of the two catalysts, as measured by the starting temperatures necessary to achieve the indicated per-pass conversion, were:

| Catalyst: | Starting T, °F. |
|---|---|
| C | 730 |
| D | 773 |

The 300°–550° F. jet fuel boiling range product in each case was of the same adequate quality, in that in each case the smoke point was 21 mm. and the freeze point was below −94° F.

From this example, it appears that the non-metal-loaded molecular sieve-containing gel catalyst (Catalyst C) has hydrocracking activity superior to that of a catalyst (Catalyst D) that does not contain a molecular sieve component but that is otherwise identical.

Example 9

Additional portions of Catalyst C and D of Examples 6 and 7 were separately used to hydrocrack separate portions of an Arabian gas oil feedstock, on a once-through basis.

The gas oil feedback had the following characteristics:

| | |
|---|---|
| Boiling range, °F. | 500–850 |
| Organic nitrogen content, p.p.m. | 200 |

The hydrocracking conditions were:

| | |
|---|---|
| Total pressure, p.s.i.g. | 1400 |
| Total hydrogen rate, s.c.f./bbl. | 5500 |
| Per-pass conversion to products boiling below 550° F., vol. percent | 70 |
| Starting temperature, ° F. | |
| Liquid hourly space velocity, v./v./hr. | As indicated below. |

The hydrocracking activities of the two catalysts, as measured by the starting temperatures needed to achieve the indicated per-pass conversion, and the liquid feed rates used in each case, expressed as liquid hourly space velocities, and the fouling rates of the two catalysts, were:

| | Catalyst C | Catalyst D |
|---|---|---|
| Starting temperature, ° F | 755 | 773 |
| Liquid hourly space velocity, v./v./hr | 1.5 | 1.0 |
| Fouling rate, ° F./hr | 0.01 | 0.050 |

From this example, it appears that not only was Catalyst C more active and also more stable than Catalyst D, but that it was more active and more stable at a 50% higher feed rate than Catalyst D.

Example 10

A cogelled catalyst (Catalyst E) was prepared exactly as in Example 6, except, that the final catalyst had the following composition:

| Component: | Wt. percent of total catalyst |
|---|---|
| NiO | 16.4 |
| $WO_3$ | 21.8 |
| $TiO_2$ | 8.6 |
| $Al_2O_3$ | 39.2 |
| $SiO_2$ | 0.0 |
| Crystalline zeolitic molecular sieve, "Y" form | 14.0 |
| Total | 100.0 |

Example 11

A cogelled catalyst (Catalyst F) was prepared exactly as in Example 7, except that the final catalyst had the following composition:

| Component: | Wt. percent of total catalyst |
|---|---|
| NiO | 19.1 |
| $WO_3$ | 25.3 |
| $TiO_2$ | 5.6 |
| $Al_2O_3$ | 30.5 |
| $SiO_2$ | 19.5 |
| Molecular sieve | 0.0 |
| Total | 100.0 |

Example 12

Catalysts E and F of Examples 10 and 11 were separately used to concurrently hydrodenitrify and hydrocrack separate portions of a California gas oil feedstock, on a once-through basis.

The gas oil feedstock had the following characteristics:

| | |
|---|---|
| Boiling range, °F | 500–900 |
| Gravity, °API | 19 |
| Organic nitrogen content, p.p.m. | 3000 |

The hydrofining-hydrocracking conditions were:

| | |
|---|---|
| Total pressure, psig | 1500 |
| Total hydrogen rate, s.c.f/bbl. | 3600 |
| Temperature, °F. | 750 |
| Liquid hourly space velocity, v./v./hr. | 0.5 |

At the end of 100 hours on stream, the hydrocracking activity indices of the two catalysts, as measured by the gravity of the whole product in degrees API minus 19 (the gravity of the feed in degrees API), and the organic nitrogen content of the separate products in parts per million, were:

| | Catalyst E | Catalyst F |
|---|---|---|
| Hydrocracking activity index | 11 | 14 |
| Product nitrogen, p.p.m | 1.2 | 0.5 |

From this example, it appears the Catalyst E, a cogelled catalyst containing a molecular sieve component but containing no silica in the gel portion of the catalyst, was inferior in both hydrodenitrification efficacy and hydrocracking efficacy to a similar catalyst containing no molecular sieve component but containing silica. That is, it appears that for maximum hydrodenitrification and hydrocracking efficacy a catalyst containing Group VI and VIII hydrogenating components and alumina should contain, in addition, both a molecular sieve component and additional silica.

Example 13

Another portion of Catalyst C of Example 6 is used to hydrocrack a solvent-deasphalted hydrocarbon oil boiling above 550° F. and containing 5500 p.p.m. organic nitrogen, on a once-through basis. Thereupon, said portion of Catalyst C. is used to hydrocrack another portion of the same solvent-deasphalted oil, with extinction recycle of products boiling above 550° F.

The hydrocracking conditions, after operating equilibrium is reached, are:

| | Catalyst C once-through | Catalyst C recycle |
|---|---|---|
| Temperature, ° F | 800 | 799 |
| Total pressure, p.s.i.g | 2,495 | 2,505 |
| Total exit gas rate | 9,120 | 9,300 |
| Liquid hourly space velocity, v./v./hr | 0.75 | 0.81 |
| Conversion to 550° F.—, vol. percent | 41.3 | 74.4 |
| 300°–550° F. jet fuel product fraction: | | |
| Yield, vol. percent | 30.0 | 51.8 |
| Smoke point, mm | 20 | 31 |
| Freeze point, ° F | −66 | −72 |
| Paraffins, vol. percent | 17.1 | 36.9 |
| Naphthenes, vol. percent | 68.5 | 54.8 |
| Aromatics, vol. percnet | 14.4 | 8.3 |

From this example, it appears that a high yield of excellent-quality jet fuel is obtained from the solvent-deasphalted hydrocarbon oil feed, in both once-through and recycle operation. It also appears that the recycle operation results in superior hydrocracking activity, jet fuel yield and jet fuel quality, attributable to cracking to extinction into the jet fuel range of the normal paraffins concentrated in the high-boiling portion of the SDA oil.

Example 14

The 550° F.+ product from the once-through operation in Example 13 is further processed in a subsequent hydrocracking or catalytic cracking stage. This product is a superior, upgraded feedstock for such subsequent processing.

Conclusions

Applicant does not intend to be bound by any theory for the unexpectedly superior hydrofining and hydrocracking activity of the catalyst of the present invention, or for the unexpectedly superior hydrofining and hydrocracking stability of the catalyst. Applicant assumes that the favorable results are largely attributable to, and unique to, the particular combination of catalytic components used, coupled with a relatively high ratio of catalytic metals in the nonmolecular sieve portion of the catalyst compared with the catalytic metals in the molecular sieve portion of the catalyst, and further coupled with the low absolute amount of catalystic metals in the molecular sieve portion of the catalyst.

Although only specific embodiments of the present invention have been described, numerous variations can be made in these embodiments without denarting from

What is claimed is:

1. A catalyst of composite comprising:
   (A) A gel matrix comprising:
      (a) at least 15 weight percent silica,
      (b) alumina, in an amount providing an alumina-to-silica weight ratio of 15/85 to 80/20,
      (c) nickel or cobalt, or the combination thereof, in the form of metal, oxide, sulfide or any combination thereof, in an amount of 1 to 10 weight percent of said matrix, calculated as metal,
      (d) molybdenum or tungsten, or the combination thereof, in the form of metal, oxide, sulfide or any combination thereof, in an amount of 5 25 weight percent of said matrix, calculated as metal;
   (B) A crystalline zeolitic molecular sieve substantially in the ammonium or hydrogen form, substantially free of any catalytic loading metal or metals, said sieve further being in particulate form and being dispersed through said matrix;
   said catalyst composite being further characterized by an average pore diameter below 100 Angstroms and a surface area above 200 square meters per gram.

2. A catalyst composite as in claim 1, wherein said gel matrix further comprises a Group IV component.

3. A catalyst composite as in claim 2, wherein said Group IV component is titania.

4. A catalyst composite as in claim 1, wherein said gel matrix comprises nickel and tungsten, in the form of the metals, oxides, sulfides, or any combination thereof.

5. A catalyst composite as in claim 1, wherein said crystalline zeolitic molecular sieve is present in an amount of 1 to 70 weight percent of said composite.

6. A catalyst composite comprising:
   (A) A porous xerogel comprising:
      (a) at least 15 weight percent silica,
      (b) alumina, in an amount providing an alumina-to-silica weight ratio of 15/85 to 80/20,
      (c) nickel, in the form of metal, oxide, sulfide or any combination thereof, in an amount of 1 to 10 weight percent of said xerogel, calculated as metal,
      (d) tungsten, in the form of metal, oxide, sulfide or any combination thereof, in an amount of 5 to 25 weight percent of said xerogel, calculated as metal,
   (B) A crystalline zeolitic molecular sieve, in an amount of 1 to 70 wegiht percent of said catalyst, said sieve being substantially in the ammonium or hydrogen form, and being substantially free of any catalytic loading metal or metals, said sieve further being in the form of particles, said particles being dispersed through said xerogel; said catalyst having an average pore diameter below 100 angstroms and a surface area above 200 square meters per gram.

7. A catalyst composite as in claim 6, wherein said porous xerogel further comprises a Group IV component.

8. A catalyst composite as in claim 7, wherein said Group IV component is titania.

9. A catalyst comprising a silica-alumina matrix having dispersed in it particles of a low-sodium molecular sieve zeolite, the silica-alumina matrix having dispersed in it a Group VI metal or metal compound and a Group VIII metal or metal compound and the zeolite being substantially free of chemically or physically bonded metals or metal compounds having appreciable catalytic activity for hydrogenation.

10. A catalyst comprising a crystalline zeolitic molecular sieve of the ammonium or hydrogen form and substantially free of metals or metal compounds having catalytic activity for hydrogenation dispersed in a hydrocracking catalyst matrix comprised of silica-alumina having dispersed in it 1 to 10% by weight of nickel in the form of metal, metal oxide or metal sulfide and 5 to 25% by weight of molybdenum or tungsten in the form of metal, metal oxide or metal sulfide.

11. A hydrotreating process, selected from hydrofining and hydrocracking processes, which comprises contacting a hydrocarbon feed containing substantial amounts of materials boiling above 200° F. and selected from the group consisting of petroleum distillates, solvent-deasphalted petroleum residua, shale oils and coal tar distillates, in a reaction zone with hydrogen and the catalyst of claim 1, at operating conditions including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of feedstock, and recovering hydrotreated products from said reaction zone.

12. A process as in claim 11, wherein said hydrocarbon feed is hydrocracked in said reaction zone, and where hydrocracked products are removed from said reaction zone.

13. A process as in claim 11, wherein said hydrocarbon feed contains organic nitrogen compounds and is denitrified in said reaction zone, and wherein denitrified products are removed from said reaction zone.

References Cited
UNITED STATES PATENTS 3,140,253   7/1964   Plank et al. _____ 208—120

DELBERT E. GANTZ, Primary Examiner

R. BRUSKIN, Assistant Examiner

U.S. Cl. X.R.

208—89; 252—455

UNITED STATES PATENT OFFICE
CERTIFICATE OF CORRECTION

Patent No. 3,558,475          Dated January 26, 1971

Inventor(s) JOSEPH JAFFE

It is certified that error appears in the above-identified patent and that said Letters Patent are hereby corrected as shown below:

Col. 5, line 72, & Col. 6, line 68, "$C_4$-fraction" should read -- $C_4$- fraction --.

Col. 8, line 50, "300° - 500°F." should read -- 300° - 550°F. --.

Col. 10, line 20, "$WO_3$ .... 25.0" should read -- $WO_3$ .... 25.2 --.

Col. 11, about line 18, "0.050" should read -- 0.055 -

Signed and sealed this 17th day of August 1971.

(SEAL)
Attest:

EDWARD M. FLETCHER, JR.
Attesting Officer

WILLIAM E. SCHUYLER, JR.
Commissioner of Patents